No. 751,647. PATENTED FEB. 9, 1904.
F. E. HUTCHINS.
INSTRUMENT FOR MEASURING ANGLES.
APPLICATION FILED DEC. 17, 1903.
NO MODEL. 3 SHEETS—SHEET 1.

Witnesses: Inventor:

No. 751,647. PATENTED FEB. 9, 1904.
F. E. HUTCHINS.
INSTRUMENT FOR MEASURING ANGLES.
APPLICATION FILED DEC. 17, 1903.
NO MODEL. 3 SHEETS—SHEET 2.

Witnesses:

Inventor:

No. 751,647. PATENTED FEB. 9, 1904.
F. E. HUTCHINS.
INSTRUMENT FOR MEASURING ANGLES.
APPLICATION FILED DEC. 17, 1903.
NO MODEL. 3 SHEETS—SHEET 3.

Witnesses: Inventor:

No. 751,647.

Patented February 9, 1904.

UNITED STATES PATENT OFFICE.

FRANCIS E. HUTCHINS, OF WARREN, OHIO.

INSTRUMENT FOR MEASURING ANGLES.

SPECIFICATION forming part of Letters Patent No. 751,647, dated February 9, 1904.

Application filed December 17, 1903. Serial No. 185,604. (No model.)

*To all whom it may concern:*

Be it known that I, FRANCIS E. HUTCHINS, a citizen of the United States of America, and a resident of Warren, in the county of Trumbull and State of Ohio, have made a certain new and useful Improvement in Instruments for Measuring Angles; and I declare the following to be a full, clear, and exact description of the same, such as will enable others skilled in the art to which it appertains to make and use the invention, reference being had to the accompanying drawings, and to letters and figures of reference marked thereon, which form a part of this specification.

My invention or device is designed to provide for the accurate measurement of angles, and is an improvement on the device described and claimed in my application filed November 5, 1902, Serial No. 130,202. It is here described chiefly in its application to the ordinary transit instrument, although upon the same principle it may be applied to the theodolite or to other instruments for measuring vertical angles.

Figure 1:
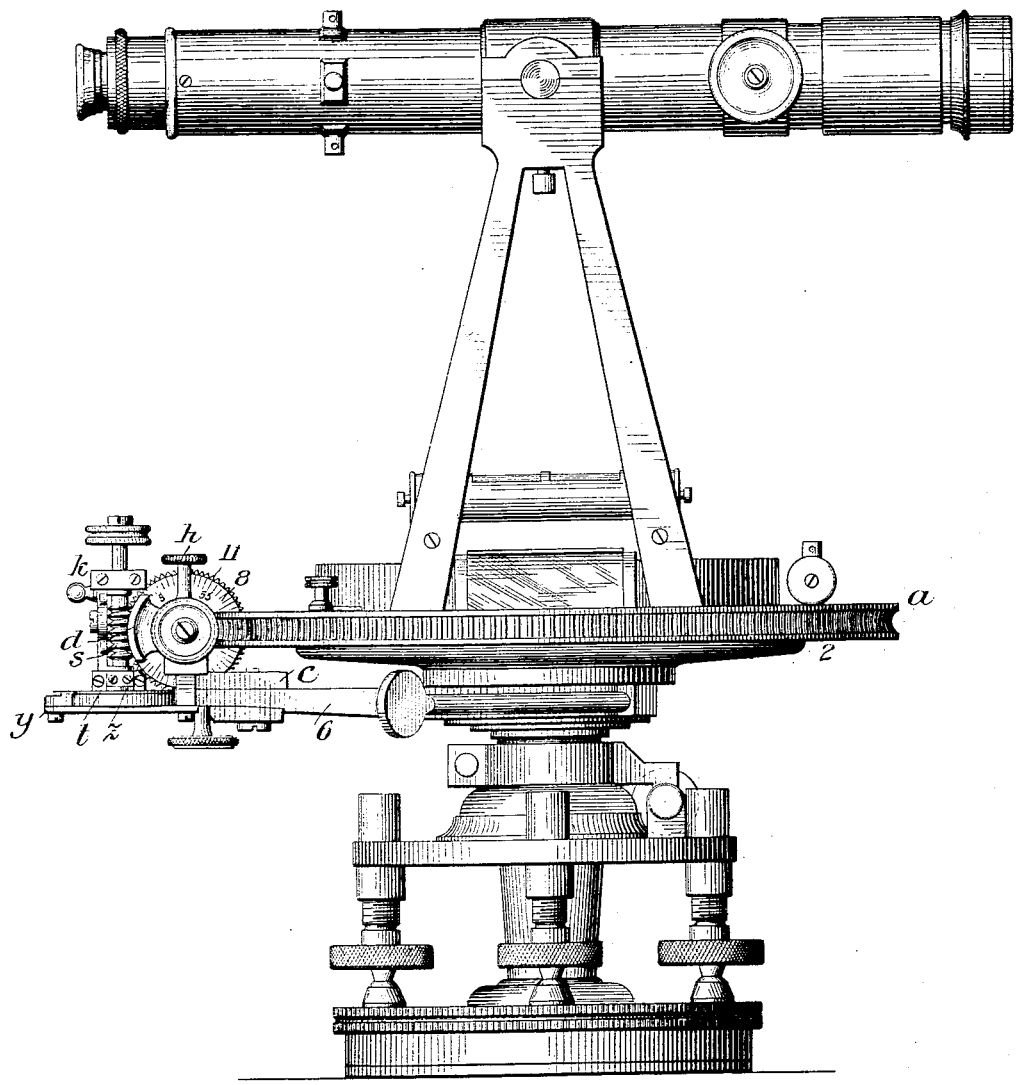
Figure 2:
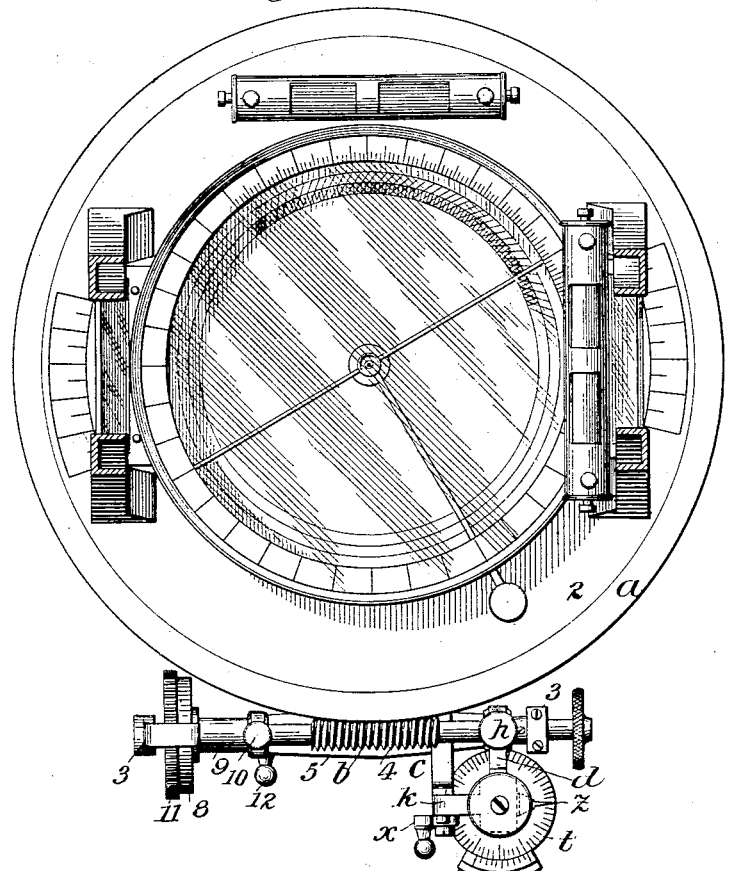
Figure 3:
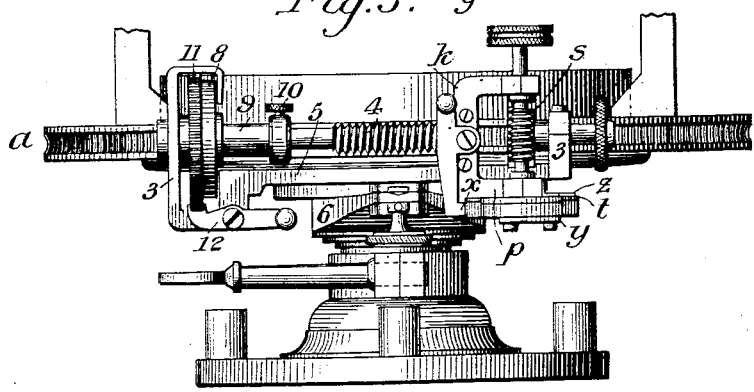
Figure 4:
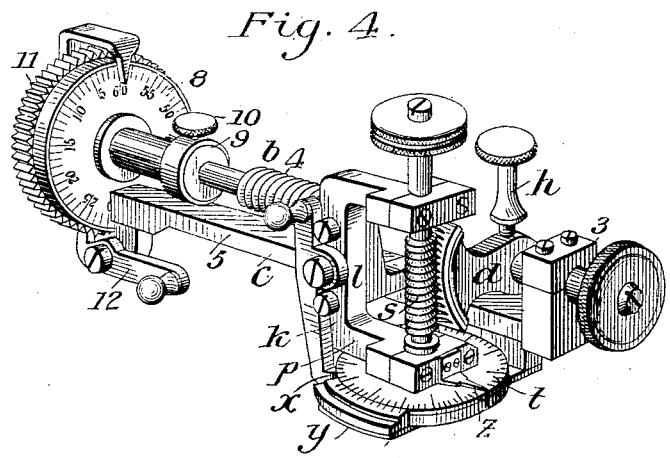
Figure 5:
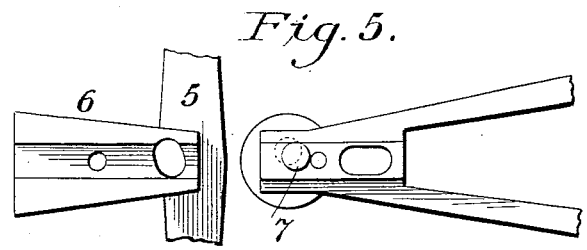
Figure 6:
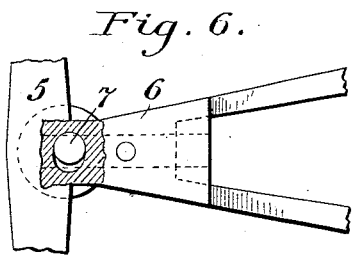

Figure 1 is a side elevation showing the invention. Fig. 2 is a top view without the telescope. Fig. 3 is a front view without the telescope. Fig. 4 is a perspective view of the tangent minute-screw and its connection, and Figs. 5 and 6 are views of detail.

Applied to the transit it consists of the rim *a*, reinforcing the upper circular plate 2, carrying the telescope, compass-box, and level to such circumference that three hundred and sixty equidistant threads or teeth, with the pitch that may be selected, will exactly compass it. The periphery of this rim is grooved and cut with three hundred and sixty threads or teeth, representing degrees, with the pitch stated later herein.

The minutes-screw *b*, tangent to the rim *a*, is supported by the uprights 3 of the frame *c*. The middle portion 4 of this minutes-screw is cut with threads or teeth corresponding with and serving to engage the threads or teeth in the rim aforesaid, so as to form a screw-gear for rotating the upper circular plate by turning the minutes-screw. The pitch of the threads in both pieces is such that one revolution of the minutes-screw will move the upper circular plate just one degree.

The frame *c* consists of a bar 5, (in this case horizontal,) having a lateral projection 6 near the middle for attachment to the clamp, or if the instrument has no clamp then to the lower circular plate or to some part of the instrument that can be fixed, while the upper circular plate rotates, there being at each end of the bar an upright 3, through which the minutes-screw passes, the whole forming the support and bearings for the minutes-screw. This attachment of the frame to the clamp or other portion of the instrument is adjustable, so as to permit a slight movement of the frame *c* from and toward the center, so as to engage and disengage the threads of the screw-gear aforesaid. This movement is accomplished by an eccentric 7, moving in a slot at the place of attachment and having a stem and head for manipulation, the arrangement being such that a quarter-revolution of the eccentric will move the frame, so as to engage or disengage the threads of the screw-gear aforesaid. Near the upright at one end this minutes-screw passes rotatably through a vertical dial 8, called the "minutes-dial," and is so adjusted, as stated later, that the minutes-screw may be rotated while the dial remains stationary or both may be moved together, and will so move together by friction when the minutes-screw turns unless the dial is fastened, as by the dial-catch mentioned later. This dial 8 is graduated by lines on its face at the edge into sixty equal parts for minutes. These lines are numbered by fives from "1" to "60." A stationary index or pointer is arranged close to the edge of the face of the dial in such wise that as the dial revolves its lines and figures of graduation will move directly past the point of the index. The upright above referred to near the dial may serve as this stationary index or pointer in this way: The upright is extended so as to pass up to the edge of the dial, then across its edge and downward, being brought to a point a short distance down the face of the dial. Past the point of this index the lines and figures revolve as the dial turns. The movement of this dial when the minutes-screw turns is controlled and indicated in this way—namely, in passing through the dial, as above stated, the minutes-screw passes also and first through a sleeve 9, fastened to the dial. Through one side of this sleeve passes a set-screw 10, called the "dial-screw," the end of which when tightened comes in contact with the shaft of the minutes-screw and fastens the dial to that shaft, so that dial must turn when the minutes-screw turns, and when the dial-screw is loosened the minutes-screw may revolve, while the dial remains stationary. Around the periphery of this dial or of the casing containing it is a thin narrow flange 11, cut into sixty equidistant triangular grooves for minutes under this flange, and attached to the horizontal bar of the frame $c$ by a screw which is also its fulcrum is a horizontal lever 12, (here called the "dial-catch,") one arm of which under said flange is of such size, shape, and position that when the other arm of the lever is pressed downward this shaped end will rise, enter, and fill one of the grooves in said flange, thus preventing any rotation of the dial. The adjustment is such that the shaped end of the lever will thus enter one of the grooves in the flange when and only when the aforesaid index or pointer coincides with a minutes-mark on the dial, and the use of the lever will also force the dial into that position and will always show that it is so, so that, for example, with the pointer at "60" or zero on the dial and this lever or dial-catch engaged with a groove in the flange to make it certain that it is exactly so, if the lever is then disengaged from the groove and the dial turned and the lever again engaged the movement has necessarily been of exactly one or more whole minutes, and the dial and pointer will tell their exact number, thus measuring exactly and certainly and indicating plainly the exact extent of the movement, the whole being so arranged as to fix the dial stationary with the pointer at zero or any other point while the minutes-screw revolves and to compel the dial to turn with the minutes-screw when desired, and to measure accurately and indicate plainly and certainly the extent of such movement in minutes. At the other end and outside of that upright this minutes-screw has a milled head for manipulation. This completes the minutes device, in which it is apparent that the minutes-screw will serve also every purpose of the tangent-screw in the ordinary transit, besides measuring and indicating correctly the micrometer movement.

Toward its head the minutes-screw $b$ aforesaid passes rotatably through the center of a sector $d$, through the hub of which a set-screw $h$ (herein called the "sector-screw") passes to and against the shaft of the minutes-screw and when tightened serves to fix the sector to the minutes-screw and when loosened permits the minutes-screw to turn while the sector remains stationary. The periphery of this sector is cut into threads or teeth corresponding with and serving to engage those on the seconds-screw, mentioned later herein.

Either mounted upon or forming part of the frame $c$ aforesaid is another frame, $k$, consisting of a bar $l$, (in this case vertical,) having an offset $p$ (in this case horizontal) at each end, through which the seconds-screw S passes, the whole forming a support and bearings for the seconds-screws. The vertical seconds-screw $s$ passes through the offsets of the frame $k$ and directly in front of and tangent to and in contact with the periphery of the sector $d$. The middle portion of this seconds-screw is cut in threads or teeth to correspond with and to always engage those on the periphery of the sector, thus forming a screw-gear for the partial rotation of the minutes-screw by turning this seconds-screw. The threads of this seconds-screw and those of the sector and the radius of the sector are such that one revolution of the seconds-screw will turn the minutes-screw just one-sixtieth of a revolution, or one minute. At the lower end this seconds-screw is fastened through the center of a dial $t$, which is graduated into sixty equal parts for seconds and numbered like the minutes-dial first described, and which as the seconds-screw is turned revolves its lines and figures past a stationary index or pointer $z$ to indicate the movement in seconds. At the other end this screw has a milled head for manipulation.

When the clamp or other part on which the frame C is mounted is fastened and the threads of the minutes-screw and of the rim are engaged, it is apparent that the upper circular plate cannot be turned except by turning the minutes-screw, and that when the sector-screw is also tightened neither that plate nor the minutes-screw can be turned except by turning the seconds-screw. Now when in this situation the first screw-gear is disengaged and the upper circular plate turned it is evident that the threads of these parts will not mesh or engage again, the minutes-screw remaining fixed unless the movement of the upper circular plate has been one or more whole degrees, and that the needle or vernier will tell the number of those degrees. This is the basic principle of the whole device.

The means for measuring, indicating, and reading the tenths of a second of a movement beyond whole seconds are described as follows: In the periphery of the seconds-dial or the casing containing it is a small groove which is entered and filled by the lower end of the "stop-catch" X, which is a movable catch attached to the frame K, so that it may engage or disengage the said small groove in the periphery aforesaid. This is so adjusted that it may thus enter when and only when "60" or zero of the seconds-dial coincides with its pointer, and pressing the end of this stop-catch into the groove will both force the seconds-dial into that position and make it certain that it is so, thus affording a sure and certain starting-point from which to measure the seconds of a movement beyond whole minutes. Mounted in any way upon the frame K is the vernier $y$. This vernier $y$ is on the same plane as and adjoining the graduated face of the seconds-dial, and making with such graduation a vernier for measuring and indicating tenths of a second. This, as is believed, is the only place where a vernier need be used.

The operation is here explained by a single instance—namely, required the angle between two objects. Having adjusted the instrument as in ordinary cases, then with the first-mentioned screw-gear disengaged, the dial-catch engaged with a groove in the flange with its pointer at "60," and the sector-screw loosened, point the telescope at the first object and with the eccentric engage the threads of the first screw-gear. Now if the glass does not still point exactly at the first object move it by turning the minutes-screw. Note the course. If the needle is not exactly on a degree-mark, call the course that which is indicated by the degree-mark nearest the needle on that side of it next to the north pole of the compass-box, if the course is northerly, and the one next to the south pole, if the course is southerly. Read this way, we will say the course is "N. 6° W." Pay no attention to the minutes. Now tighten the sector-screw, so as to rigidly fix the minutes-screw. Then with the eccentric disengage that screw-gear and move the glass until it points to the second object. Now with the eccentric, assisted, if necessary, by gentle movements to and fro of the upper circular plate with the hand, engage the screw-gear. The movement will now have been a certain number of whole degrees. This engagement may have thrown the glass away from the object; but if what is thus directed has been carefully done the glass will point within less than one degree toward the second object, but it may be more than that. In either case next loosen the sector-screw and the dial-catch, tighten the dial-screw, and with the minutes-screw turn the glass to the second object, which may require one or more revolutions of that screw. Now note the course as before by taking the degree-mark nearest the needle, but on the same side of it, as at the first time. Read in this way, the course is (we will say) "N. 36° W.," and the minutes-dial shows a further movement of (we will say) twenty minutes, which is to be added. If the pointer is between two minutes-lines and the seconds are required, turn the minutes-screw back until the pointer coincides with the next minutes-line. Engage the dial-catch to make that position certain. Then with the seconds-pointer at "60" of the seconds-dial fasten the sector-screw, disengage the dial-catch, and with the seconds-screw move the glass until it sights the second object, the seconds-dial indicating (we will say) thirty seconds plus, the seconds-pointer being between two seconds-lines on the dial. The vernier will then tell the tenths of a second beyond whole seconds. Then the reading will be from the compass-box N. 36° W., from the minutes-dial twenty minutes, and from the seconds-dial thirty seconds, and from the vernier, we will say, four-tenths. Deducting the first course six degrees we have the exact movement, thirty degrees, twenty minutes, thirty and four-tenths seconds, which is the required angle. This measurement may be made in this way in a very expeditious manner inside of five minutes.

For convenience in reading it will be found preferable to use the instrument with the north pole of the compass-box toward the north and to read the course in the manner above indicated. It will also be found more convenient if in making the second engagement of the screw-gear, as above, the circular plate be so moved that the glass will be turned a little toward the first object rather than beyond the second object, so that the minutes are added, not subtracted.

This device is designed to be especially useful in triangulation and in all cases where the accurate measurement of an angle is required. As an attachment to an instrument for measuring angles it is designed to provide such means as will enable the operator to readily move the telescope any number of whole degrees and by positive means to measure and indicate accurately the minutes of such movement beyond the whole degrees by one turn of a thumb-screw, and by positive means to measure and indicate accurately the seconds and fractions of a second of the movement beyond the minutes by one turn of another thumb-screw, the accuracy of the movement not being affected by any variation or declination of the magnetic needle.

The means of positive measurement and indication of the minutes and seconds herein described are designed to be distinguished from such means as involve the reading of an adjusted vernier in its relation to a graduated dial-plate, such means of reading being subject to the nervous personality of the operator and to other mistakes, and therefore not mechanically positive, such as they are in the present invention, wherein the means which bring the dial-plates and indicators to their respective positions of exact measurement and indication are of mechanical character, thus substituting for the vernier a much more accurate, certain, plainly-read, and expeditious method.

Having described my invention, what I claim, and desire to secure by Letters Patent, is—

In an instrument for measuring angles, the combination with the telescope and degree-plate, of a minutes-screw, means for engaging and disengaging the degree-plate and the minutes-screw, a minutes-dial having a grooved flange around its periphery, a pointer and a lever-catch, means of fastening that dial to the minutes-screw, a sector and means for fastening it to the minutes-screw, a seconds-screw having threads engaging the periphery of the sector, a seconds-dial having a pointer, a vernier and a stop-catch, the whole constituting means for micrometer movement of the telescope and for measuring and indicating in degrees, minutes, seconds, and tenths of a second the exact extent of any movement of the telescope from a given course or point and the exact course or point and the exact value of any angle, substantially as specified.

In testimony whereof I affix my signature in the presence of two witnesses.

FRANCIS E. HUTCHINS.

Witnesses:
A. M. BUNN,
C. H. WILSON.